United States Patent
Ueno et al.

(10) Patent No.: US 7,376,490 B2
(45) Date of Patent: May 20, 2008

(54) OPERATIONAL CONTROL DEVICE, OPERATIONAL CONTROL METHOD, PROGRAM AND STORAGE MEDIUM THEREOF, FOR A PLURALITY OF POWER CONSUMPTION SYSTEMS

(75) Inventors: Katsunori Ueno, Tokyo-To (JP); Tomoya Takahashi, Tokyo-To (JP); Makoto Umeki, Tokyo-To (JP)

(73) Assignee: Tokyo Electron Limited, Tokyo-To (JP)

( * ) Notice: Subject to any disclaimer, the term of this patent is extended or adjusted under 35 U.S.C. 154(b) by 256 days.

(21) Appl. No.: 11/347,568

(22) Filed: Feb. 6, 2006

(65) Prior Publication Data
US 2006/0253225 A1 Nov. 9, 2006

(30) Foreign Application Priority Data
Feb. 18, 2005 (JP) ............................. 2005-043244

(51) Int. Cl.
*G06F 19/00* (2006.01)
(52) U.S. Cl. .................................... 700/291; 700/286
(58) Field of Classification Search ................ 700/291, 700/286; 455/343.2, 574; 708/620
See application file for complete search history.

(56) References Cited

U.S. PATENT DOCUMENTS

2002/0099751 A1* 7/2002 Chen et al. ................. 708/620
2003/0065471 A1* 4/2003 Tsuji et al. .................. 702/130
2003/0087597 A1* 5/2003 Ohkouchi .................... 454/187
2004/0069448 A1* 4/2004 Suenaga et al. .............. 165/47

FOREIGN PATENT DOCUMENTS

JP 08-181110 7/1996
JP 09-56068 2/1997

OTHER PUBLICATIONS

Suenage et al., A proposal for Energy saving in semiconductor Fabs., 1999, IEEE, p. 255-258.*
Tsai et al., Stratagies of Energy saving in a Wafer Fab., 2002, IEEE, p. 85-89.*

\* cited by examiner

*Primary Examiner*—Kidest Bahta
(74) *Attorney, Agent, or Firm*—Smith, Gambrell & Russell, LLP

(57) ABSTRACT

A operational control device for supplying electric power from an electric power equipment to a plurality of power consumption systems store a power consumption pattern for each of the power consumption systems. It obtains a combined expected power consumption pattern by adding power consumption patterns of the operating power consumption systems. Next, a combined assumed power consumption pattern is obtained by adding a power consumption pattern, obtained based on a temporary operational start time, of a power consumption system which has made a request for a starting operation.

17 Claims, 4 Drawing Sheets

OPERATIONAL CONTROL DEVICE, OPERATIONAL CONTROL METHOD, PROGRAM AND STORAGE MEDIUM THEREOF, FOR A PLURALITY OF POWER CONSUMPTION SYSTEMS

BACKGROUND OF THE INVENTION

1. Field of the Invention

The present invention relates to an operational control device, an operational control method, a program and a storage medium thereof, for a plurality of power consumption systems in a power supply system for supplying electric power to the plurality of power consumption systems, such as processing equipments which provide desired processes to semiconductor wafers or the like.

2. Background Art

In general, for manufacturing semiconductor integrated circuits, liquid crystal devices or the like, various processing equipments are used for repeatedly subjecting materials to be processed, such as semiconductor wafers, LCD substrates and the like, to various processes, including oxidation, film-forming, diffusion, annealing, reforming and the like.

In such a case, it is common to prepare a plurality of the same or different processing equipments for subjecting the wafers or LCD substrates to desired processes in succession and completing the products, and operate each of the processing equipments in parallel to enhance the throughput. For wafers and LCD substrates, since heating and plasma processes are mainly performed, each processing equipment consumes relatively a large amount of electric power. In addition, power supply equipments for supplying electric power to those units are relatively expensive. Therefore, if only one power supply equipment is used to supply electric power to a plurality of processing equipments, it is usual to prepare a power supply equipment that meets the power capacity corresponding to "the normal rated power of each processing equipment (the maximum power)×the number of units" in order to make the power supply equipment as small as possible.

However, all processing equipments are not always driven at the normal rated power. In fact, the time for which they are driven at the normal rated power is relatively short. In the case of a processing equipment for performing a heating process, this unit is used for a temperature raising step for elevating the wafer temperature and also used for a step for maintaining a constant temperature, thus making quite a large difference in the electric power consumption between the two steps. In the temperature raising step, the electric power consumption becomes large approximately to the normal rated power, while in the temperature maintaining step, depending on the types of processes, the electric power consumption is relatively small, ranging from 10 to 60% of the rated power. Accordingly, the above prior art power supply equipments should have significantly large margin of the power capacity, thus leading to increase in the cost of such power supply equipments and increase in the contract rate to the electric power company.

To address these disadvantages, methods for controlling the increase in the cost of power supply equipments have been disclosed in the following Patent Documents 1 and 2, and the like. For example, the method disclosed in the Patent Document 1 comprises detecting and monitoring electric power generated from an electric power supply equipment; comparing the detected electric power to a reference value before individual power consumption system starts a new step; and judging whether or not the new step is to start based on the comparison.

Documents Cited:
Patent Document 1: TOKUKAIHEI No. 9-56068, KOHO
Patent Document 2: TOKUKAIHEI No. 8-181110, KOHO In such prior art methods, upon starting a step, judgment of whether or not to start the step was determined by comparison between actually detected electric power and a reference value obtained by referring to the amount of power consumption in a step which requires the maximum power consumption. However, since these prior art methods did not consider any change in the amount of power consumption over time for each processing equipment, so once a process was started, such a change in the amount of power consumption along the proceeding of the process of each processing equipment was not controlled enough.

SUMMARY OF THE INVENTION

The present invention was made in the light of the above-described problems, and is constructed to effectively overcome the same. It is an object of the present invention to provide an operational control device, an operational control method, a program and a storage medium thereof, for a plurality of power consumption systems, which can establish a high operating efficiency while controlling the equipment cost.

The present invention provides an operational control device for a plurality of power consumption systems in a power supply system which is adapted to supply electric power from an electric power equipment to the plurality of power consumption systems in which whether or not to start the operation is decided depending on an external signal, the device comprising: a main control unit for controlling the operation of the entire body of the device; a power consumption pattern storage unit for storing in advance a power consumption pattern showing changes in the power consumption with respect to time elapsing after starting operation for each of the power consumption systems; an expected operational start time decision unit which (1) obtains a combined expected power consumption pattern by adding together power consumption patterns of operating power consumption systems based on an operational start time of each operating power consumption system in response to a request for starting operation from an idling power consumption system, (2) obtains a combined assumed power consumption pattern by adding a power consumption pattern, obtained based on a temporary operational start time, of the idling power consumption system which has made the request for starting operation to the combined expected power consumption pattern, (3) compares an electric power value represented in the combined assumed power consumption pattern to a preset allowable power of the power supply equipment, (4) delays the temporary operational start time of the idling power consumption pattern of the power consumption system which has made the request for starting operation along the axis of time until each of the power values represented in the combined assumed power consumption pattern is no longer above the preset allowable power, and (5) decides an expected operational start time based on the temporary operational start time at which all power values represented in the combined assumed power consumption pattern are smaller than the preset allowable power; and a permission signal output unit which outputs an operational permission signal to the power consumption system which has made the request for starting operation through the main control unit when the current time reaches the expected operational start time which was decided by the expected operational start time decision unit.

In such a manner, a power consumption pattern that indicates changes in the power consumption of each power consumption system is obtained in advance. When a request for starting operation is made by an idling power consumption system, power consumption patterns of power consumption systems each operating at that time are summed together with adjustment of the axis of time to obtain a combined expected power consumption pattern. Then, the power consumption pattern of the idling power consumption system which has made the request for starting operation is added to the combined expected power consumption pattern to obtain a combined assumed power consumption pattern. Subsequently, the combined assumed power consumption pattern obtained by the addition is compared to a preset allowable electric power. Finally, the power consumption pattern of the idling power consumption system which has made a request for starting operation is shifted in the direction of the axis of time to determine an expected operational start time. Therefore, high operating efficiency can be achieved while controlling the equipment cost. In addition, the productivity relative to the equipment cost can be enhanced to the maximum.

In this case, each power consumption pattern can be updated.

In one example, the update of the power consumption pattern for each of the power consumption system is carried out based on an actual amount of power consumption generated during the past operations of each power consumption system.

In one example, the actual amount of power consumption is decided based on the power consumption of the most recent predetermined number of processes.

In one example, the actual amount of power consumption is obtained based on a watt-meter provided in the power consumption system.

In one example, the actual amount of power consumption is obtained based on amounts of controlling open and close of a gate of a thyristor provided in a power control unit of the power consumption system.

In one example, the actual amount of power consumption is obtained based on the ON-OFF control time of a gate of a thyristor provided in a power control unit of the power consumption system.

In one example, the power consumption system is a processing equipment for providing a predetermined process to a material to be processed.

The present invention provides an operational control method for a plurality of power consumption systems in a power supply system which is adapted to supply electric power from an electric power equipment to the plurality of power consumption systems in which whether or not to start the operation is decided depending on an external signal, the method comprising the steps of: storing in advance a power consumption pattern showing changes in power consumption with respect to time elapsing after starting operation for each of the power consumption systems; obtaining a combined expected power consumption pattern by adding together power consumption patterns of operating power consumption systems based on an operational start time of each operating power consumption system in response to a request for starting operation from an idling power consumption system; obtaining a combined assumed power consumption pattern by adding a power consumption pattern, obtained based on a temporary operational start time, of the idling power consumption system which has made the request for starting operation to the combined expected power consumption pattern, comparing an electric power value represented in the combined assumed power consumption pattern to a preset allowable power of the power supply equipment, delaying the temporary operational start time of the power consumption pattern of the idling power consumption system which has made the request for starting operation along the axis of time until each of the power values represented in the combined assumed power consumption pattern is no longer above the preset allowable power, and deciding an expected operational start time based on the temporary operational start time at which all power values represented in the combined assumed power consumption pattern are smaller than the preset allowable power; and outputting an operational permission signal to the idling power consumption system which has made the request for starting operation when the current time reaches the decided expected operational start time.

In one example of this method, each power consumption pattern can be updated.

In one example, the update of the power consumption pattern for each of the power consumption system is carried out based on an actual amount of power consumption generated during the past operations of each power consumption system.

In one example, the actual amount of power consumption is decided based on the power consumption of the most recent predetermined number of processes.

In one example, the actual amount of power consumption is obtained based on a watt-meter provided in the power consumption system.

In one example, the actual amount of power consumption is obtained based on amounts of controlling open and close of a gate of a thyristor provided in a power control unit of the power consumption system.

In one example, the actual amount of power consumption is obtained based on the ON-OFF control time of a gate of a thyristor provided in a power control unit of the power consumption system.

In one example, the power consumption system is a processing equipment for providing a predetermined process to a material to be processed.

The present invention provides a program of controlling an operational control device for a plurality of power consumption systems in a power supply system which is adapted to supply electric power from an electric power equipment to the plurality of power consumption systems in which whether or not to start the operation is decided depending on an external signal, the program performing the steps of: storing in advance a power consumption pattern showing changes in power consumption with respect to time elapsing after starting operation for each of the power consumption systems; obtaining a combined expected power consumption pattern by adding together power consumption patterns of operating power consumption systems based on an operational start time of each operating power consumption system in response to a request for starting operation from an idling power consumption system; obtaining a combined assumed power consumption pattern by adding a power consumption pattern, obtained based on a temporary operational start time, of the idling power consumption system which has made the request for starting operation to the combined expected power consumption pattern, comparing an electric power value represented in the combined assumed power consumption pattern to a preset allowable power of the power supply equipment, delaying the temporary operational start time of the power consumption pattern of the idling power consumption system which has made the request for starting operation along the axis of time until each of the power values represented in the combined assumed power consumption pattern is no longer above the preset allowable power, and deciding an expected operational start time based on the temporary operational start time at which all power values represented in the combined assumed power consumption pattern are smaller than the preset allowable power; and outputting an operational permission signal to the idling power consumption system which has made the request for starting operation when the current time reaches the decided expected operational start time.

The present invention provides a storage medium for storing a program of controlling an operational control device for a plurality of power consumption systems in a power supply system which is adapted to supply electric power from an electric power equipment to the plurality of power consumption systems in which whether or not to start the operation is decided depending on an external signal, the program performing the steps of: storing in advance a power consumption pattern showing changes in power consumption with respect to time elapsing after starting operation for each of the power consumption systems; obtaining a combined expected power consumption pattern by adding together power consumption patterns of operating power consumption systems based on an operational start time of each operating power consumption system in response to a request for starting operation from an idling power consumption system; obtaining a combined assumed power consumption pattern by adding a power consumption pattern, obtained based on a temporary operational start time, of the idling power consumption system which has made the request for starting operation to the combined expected power consumption pattern, comparing an electric power value represented in the combined assumed power consumption pattern to a preset allowable power of the idling power supply equipment, delaying the temporary operational start time of the power consumption pattern of the power consumption system which has made the request for starting operation along the axis of time until each of the power values represented in the combined assumed power consumption pattern is no longer above the preset allowable power, and deciding an expected operational start time based on the temporary operational start time at which all power values represented in the combined assumed power consumption pattern are smaller than the preset allowable power; and outputting an operational permission signal to the idling power consumption system which has made the request for starting operation when the current time reaches the decided expected operational start time.

With the operational control device, the operational control method and the storage medium, according to the present invention, the following effects can be obtained.

A power consumption pattern that indicates changes in the power consumption of each power consumption system is obtained in advance. When a request for starting operation is made by an idling power consumption system, power consumption patterns of power consumption systems each operating at that time are summed together with adjustment of the axis of time to obtain a combined expected power consumption pattern. Then, the power consumption pattern of the idling power consumption system which has made the request for starting operation is added to the combined expected power consumption pattern to obtain a combined assumed power consumption pattern. Subsequently, the combined assumed power consumption pattern obtained by the addition is compared to a preset allowable electric power. Finally, the power consumption pattern of the idling power consumption system which has made a request for starting operation is shifted in the direction of the axis of time to determine an expected operational start time. Therefore, high operating efficiency can be achieved while controlling the equipment cost. In addition, the productivity relative to the equipment cost can be enhanced to the maximum.

DETAILED DESCRIPTION OF THE INVENTION

Hereinafter, one embodiment of an operational control device, an operational control method, and a storage medium, for a plurality of power consumption systems, according to the present invention will be described in detail with reference to the accompanying drawings.

EXAMPLES

Figure 1:
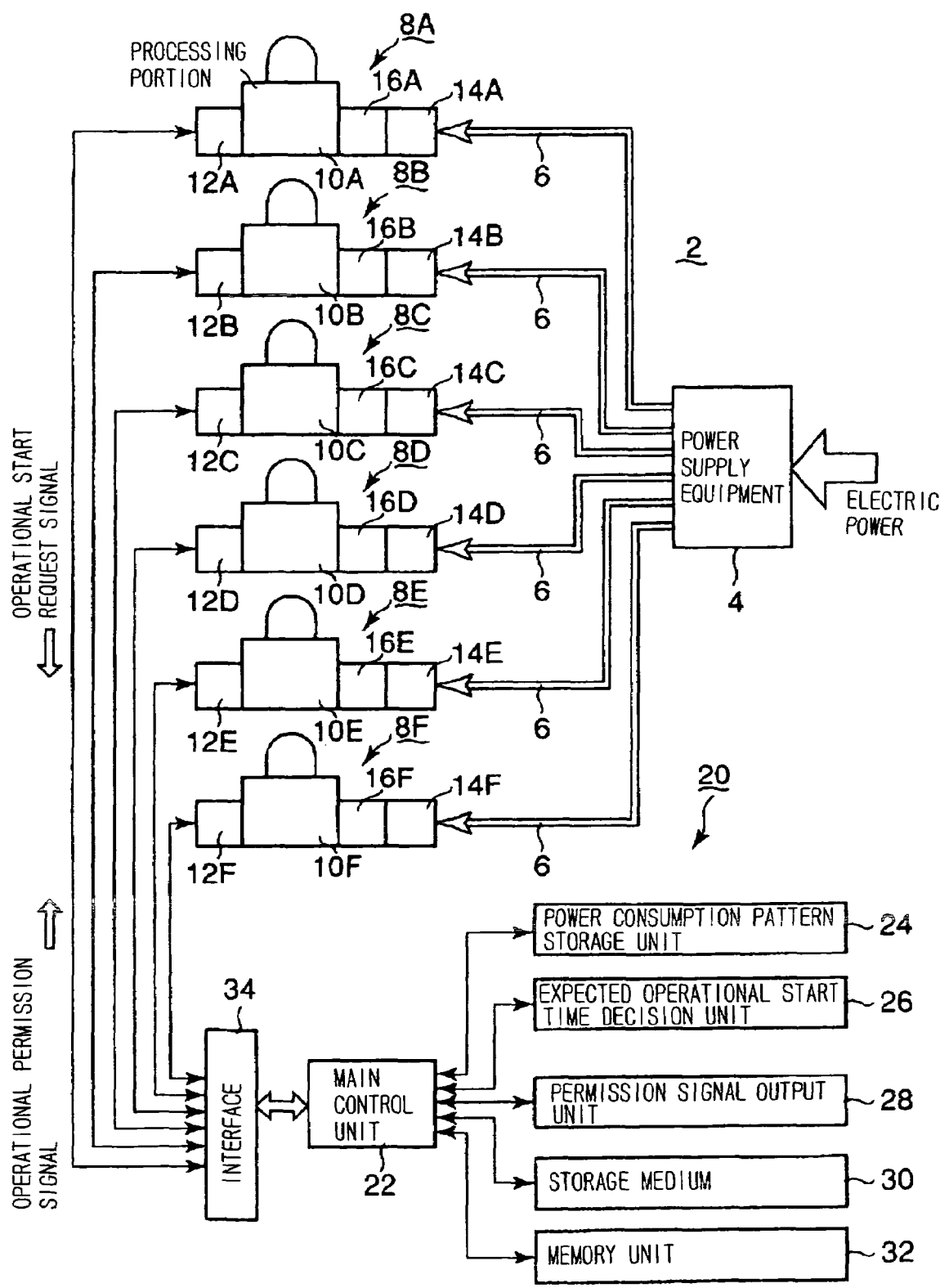
FIG. 1 is a view of illustrating a relation between an operational control device for a plurality of power consumption systems according to the present invention, and a power supply system.
Figure 2:
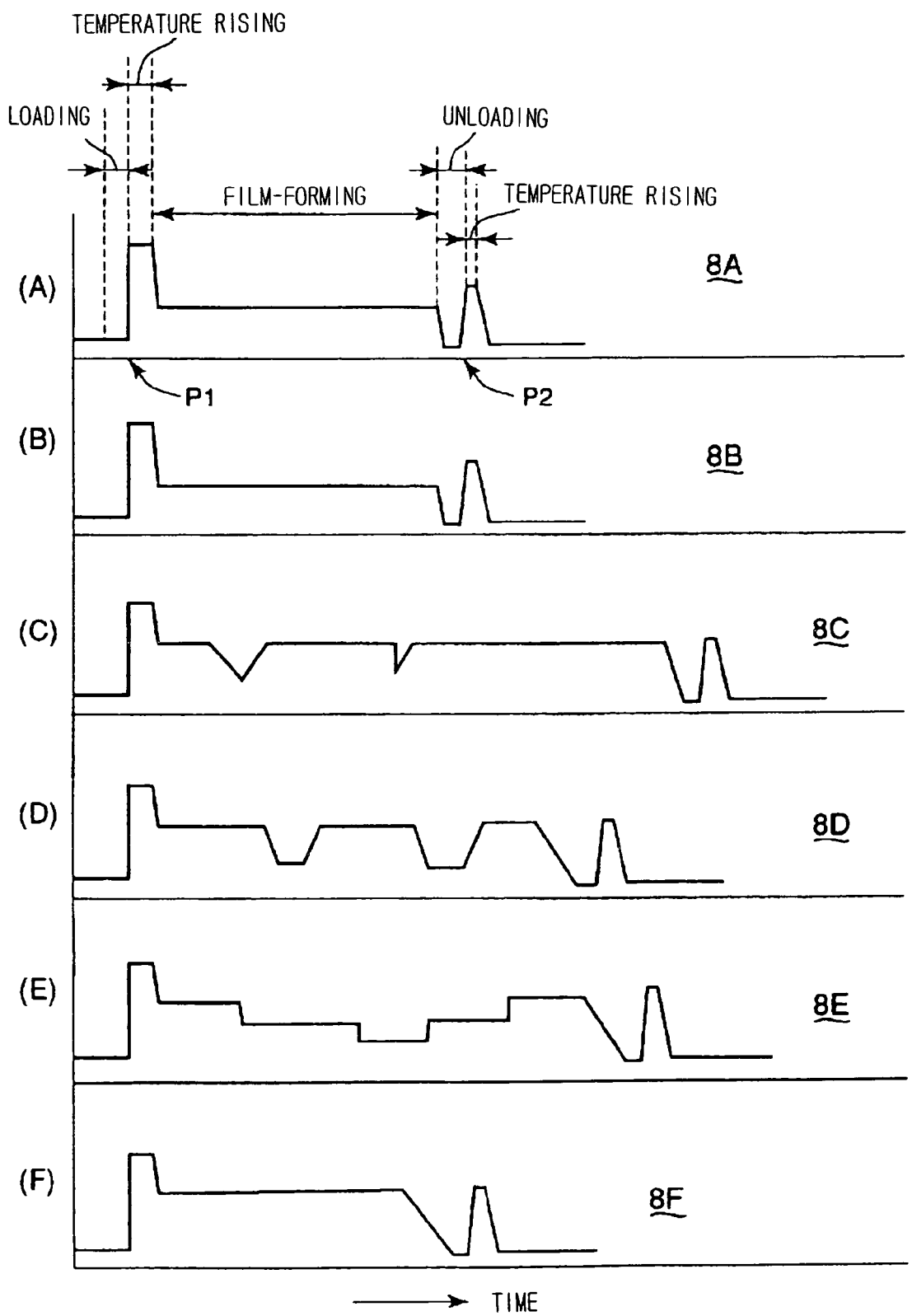
FIG. 2 is a view of illustrating a power consumption pattern of each of power consumption systems.
Figure 3:
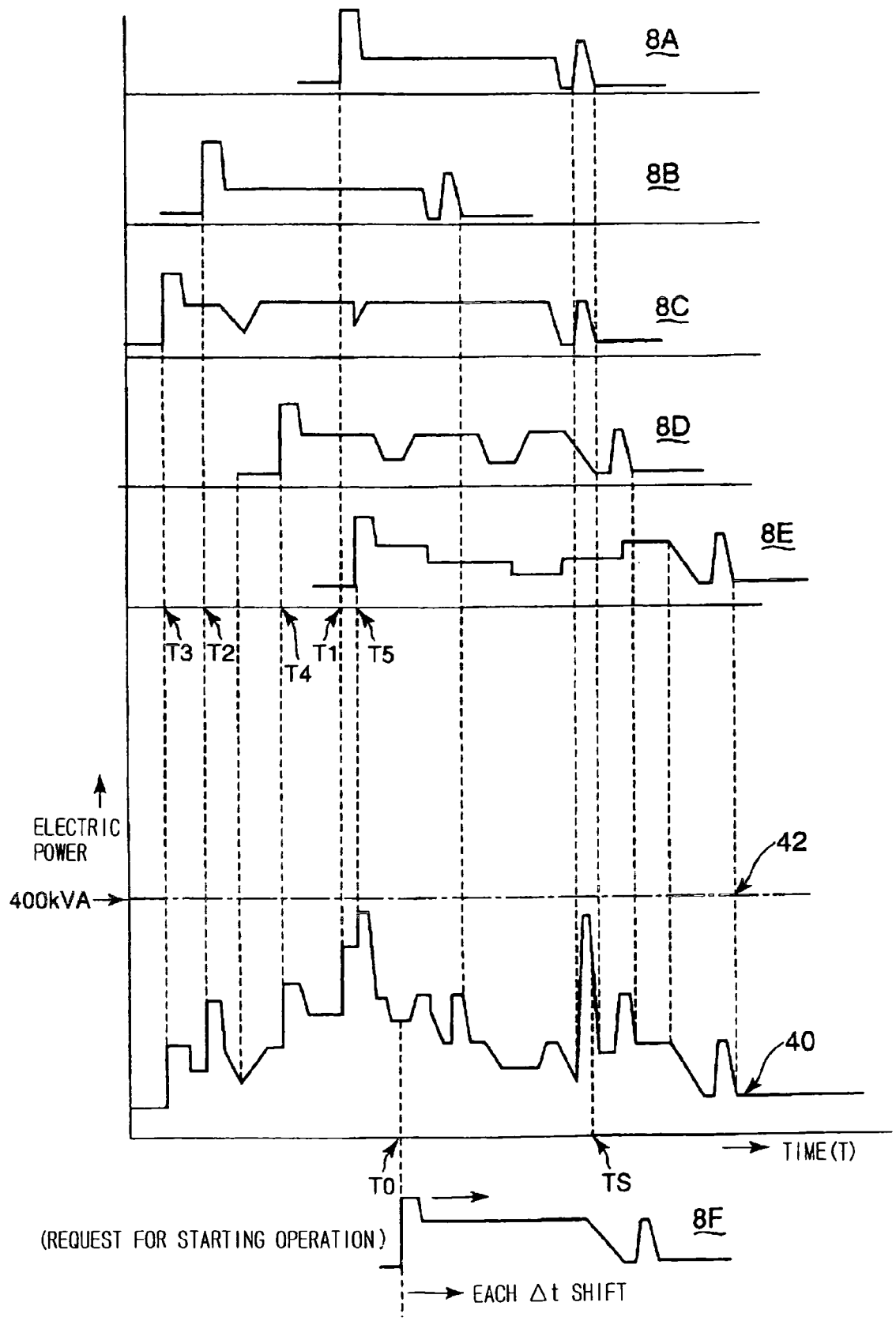
FIG. 3 is a view of illustrating a state resulting from arranging and adding each of operating power consumption patterns based on each operational start time.

FIG. 1 is a view of illustrating a relation between an operational control device, for a plurality of power consumption systems according to the present invention, and a power supply system, FIG. 2 is a view of illustrating a power consumption pattern of each of power consumption systems, and FIG. 3 is a view of illustrating a state resulting from arranging and adding each of operating power consumption patterns based on each operational start time.

As shown in FIG. 1, a power supply system 2 comprises a power supply equipment 4, from which necessary electric power is supplied to a plurality of power consumption systems (in the illustrated embodiment, shown as six processing equipments 8A, 8B, 8C, 8D, 8E, and 8F), via power lines 6, respectively.

As each of the processing equipments 8A to 8F as the above power consumption systems, a processing equipment for providing a predetermined process to materials to be processed, for example, semiconductor wafers, is used, but the type of the process is not critical here. For example, the same or different types of processing equipments may be used in suitable combinations as needed. However, the type of the process may include film-forming, oxidation and diffusion, reforming, etching, and the like.

The processing equipments 8A to 8F include respectively, processing portions 10A to 10F for actually increasing and decreasing temperature, such as heating and cooling of wafers, control portions 12A to 12F comprising, for example, microcomputers for controlling the processing portions 10A to 10*f* based on a recipe in which operations to be performed through all steps of the process are determined in advance, power control portions 14A to 14F for controlling the electric power consumption of the processing equipments 8A to 8F, and watt-meters 16A-16F for measuring and obtaining actual electric power consumption. As each of the power control portions 14A to 14F, for example, a thyristor may be used. In this case, the recipe may be preprogrammned, and each process is performed autonomously based on the program. The decision whether or not to start a process operation is made by an operational control device 20 which is one of features of this invention. The operational control device 20 and each of the control portions 12A to 12F have a communication function so that they can perform mutual transmission and reception.

Specifically, the operational control device 20 includes a main control unit 22 including a CPU, a power consumption pattern storage unit 24, an expected operational start time decision unit 26, a permission signal output unit 28, a storage medium 30 comprising a floppy disk, a hard disk drive, and a flash memory, for storing programs for controlling the entire operations of the operational control device 20, and a memory unit 32 comprising a RAM or the like which stores temporarily various data necessary for various processes. In addition, transmission and reception of data is carried out via an interface 34 between the operational control device 20 and each of the control portions 12A to 12F.

The power consumption pattern storage unit 24 stores a power consumption pattern which indicates changes in the electric power consumption with respect to time elapsing after start of an operation (after start of each process) of each power consumption system 8A to 8F. FIG. 2 illustrates an example of a power consumption pattern of each power consumption system 8A to 8F. Specifically, FIG. 2(A) shows a power consumption pattern of the power consumption system 8A, FIG. 2(B) shows a power consumption pattern of the power consumption system 8B, FIG. 2(C) shows a power consumption pattern of the power consumption system 8C, FIG. 2(D) shows a power consumption pattern of the power consumption system 8D, FIG. 2(E) shows a power consumption pattern of the power consumption system 8E, and FIG. 2(F) shows a power consumption pattern of the power consumption system 8F.

These power consumption patterns can be calculated by measuring, in advance using a watt-meter, changes with time of the amount of power consumption when each processing equipment is actually operated to perform each process, or by calculating, in advance, based on amounts of controlling open and close of a gate of a thyristor of each power control portion or on the ON-OFF control time of the gate. Actually, the power consumption patterns are made by obtaining the amount of power consumption for each predetermined time, for example, for every second.

One example of the above power consumption patterns is now described. As a processing equipment, for example, a vertical batch-type processing equipment is used, which can perform film-forming or oxidation for a plurality of wafers at a time. For a waiting time the process operation is not performed, a processing container of each processing equipment 8A to 8F is kept at a predetermined temperature significantly lower than a processing temperature using a correspondingly small amount of electric power as waiting power. In general, the time the greatest amount of electric power is used, is the time wafers are heated to a predetermined processing temperature after loading them at a normal temperature into a processing container (processing vessel) of each processing equipment 8A to 8F. The time the secondly greatest amount of electric power is used, is the time the processing container is heated again to a waiting temperature after the wafer temperature was decreased to unload the wafers after completion of the process and then the wafers were unloaded.

For example, with reference to a power consumption pattern shown in FIG. 2(A), after a wafer boat on which wafers are placed is loaded into the processing container (processing vessel), rapid temperature rising is started at point P1 to elevate the wafer temperature to a processing temperature. At that time, the amount of power consumption is at its peak and the greatest electric power is consumed for a short time. Thereafter, since a process, such as film-forming, is performed while maintaining the wafer temperature constant, the consumed electric power becomes significantly lower, and depending on the processing mode, it will be kept at an approximately constant value ranging from 25 to 60% of the peak power consumption. Once the process is completed, since the wafer temperature is lowered sufficiently to a temperature which enables unloading, the power consumption is drastically decreased. However, after the wafers are unloaded, steep temperature rising is started at point P2, the temperature of the processing container is elevated to a temperature for waiting. Again, being not so large as the peak value, a significantly large amount of electric power is consumed for a short time. The processing container is then kept at a waiting temperature, using a small amount of electric power.

Each of power consumption patterns of FIGS. 2(A), 2(B) and 2(F) shows a similar pattern. In some processes, however, a multi-process, such as one performing nitriding and oxidation successively, is conducted depending on the type of the process. In such a case, for example, as shown in FIGS. 2(C), 2(D) and 2(E), there are patterns in which the amount of power consumption is also changed in great variations repeatedly along the process. In either case, these power consumption patterns can be obtained in advance using a watt-meter or the like, as described above.

Returning to FIG. 1, the expected operational start time decision unit 26 decides, in the following procedure, an expected operational start time in response to a request for starting operation when the request is made by a processing equipment (power consumption system) during its idling or waiting state. First, in response to a request for starting operation from an idling power consumption system, a combined expected power consumption pattern is obtained by adding together power consumption patterns of operating power consumption systems based on an operational start time of each operating a power consumption system. Next, a combined assumed power consumption pattern is obtained by adding a power consumption pattern of the idling power consumption system based on a temporary operational start time, which has made the request for starting operation, to the combined expected power consumption pattern. Subsequently, each electric power value represented in the combined assumed power consumption pattern is compared to a preset allowable power of the power supply equipment 4. Thereafter, the temporary operational start time in the power consumption pattern of the idling power consumption system which has made the request for starting operation is shifted along the axis of time until each of the power values represented in the combined assumed power consumption pattern is no longer above the preset allowable power. Finally, the expected operational start time is decided based on the temporary operational start time at which all power values represented in the combined assumed power consumption pattern are smaller than the preset allowable power.

Specifically, when a request for stating operation is made by a waiting processing equipment the combined expected power consumption pattern 40 (see FIG. 3) is obtained by adding together power consumption patterns of all power consumption systems which are operating (processing) at that time based on each operational start time. FIG. 3 shows a state in which the processing equipment 8F makes a request for starting operation while the processing equipments 8A to 8E are operating.

Subsequently, a combined assumed power consumption pattern is obtained by adding the power consumption pattern of the idling processing equipment based on a temporary operational start time, which has made the request for starting operation, to the combined expected power consumption pattern 40. Next, each electric power value represented in the combined assumed power consumption pattern is compared to the preset allowable power 42 (see FIG. 3) of the power supply equipment 4. Thereafter, the temporary operational start time in the power consumption pattern of the idling processing equipment which has made the request for starting operation is shifted in the right direction in FIG. 3 along the axis of time until each of the power values represented in the combined assumed power consumption pattern is no longer above the preset allowable power.

Finally, an expected operational start time is decided based on the temporary operational start time at which all power values represented in the combined assumed power consumption pattern are smaller than the preset allowable power. In other words, based on the time when an idling processing equipment outputs an operational start request signal, the power consumption pattern of this idling processing equipment is shifted in the right direction along the axis of time relative to the combined expected power consumption pattern 40 which has been already established at this point, and added to the pattern 40. Then, whether or not the added total power consumption pattern (the combined assumed power consumption pattern) exceeds the preset allowable power 42 used as a reference value is considered. If the added total power consumption pattern does not exceed the allowable power 42, the start time in that case is determined based on the expected operational start time. Consequently, the operational start timing of the processing equipment can be controlled. Usually, the preset allowable power 42 is set at a normal rated power (the maximum allowable power) of the power supply equipment 4. However, it is preferred to set optionally the allowable power 42 within a range not exceeding the normal rated power.

Referring again to FIG. 1, the permission signal output unit 28 outputs an operational permission signal to the idling processing equipment (power consumption system) which has made a request for starting operation when the current time reaches the expected operational start time which was decided by the expected operational start time decision unit 26. Thus, the processing equipment will start its operation actually after receiving the operational permission signal.

Next, operation of the operational control device constructed as discussed above is described with reference to FIGS. 3 and 4.

Figure 4:
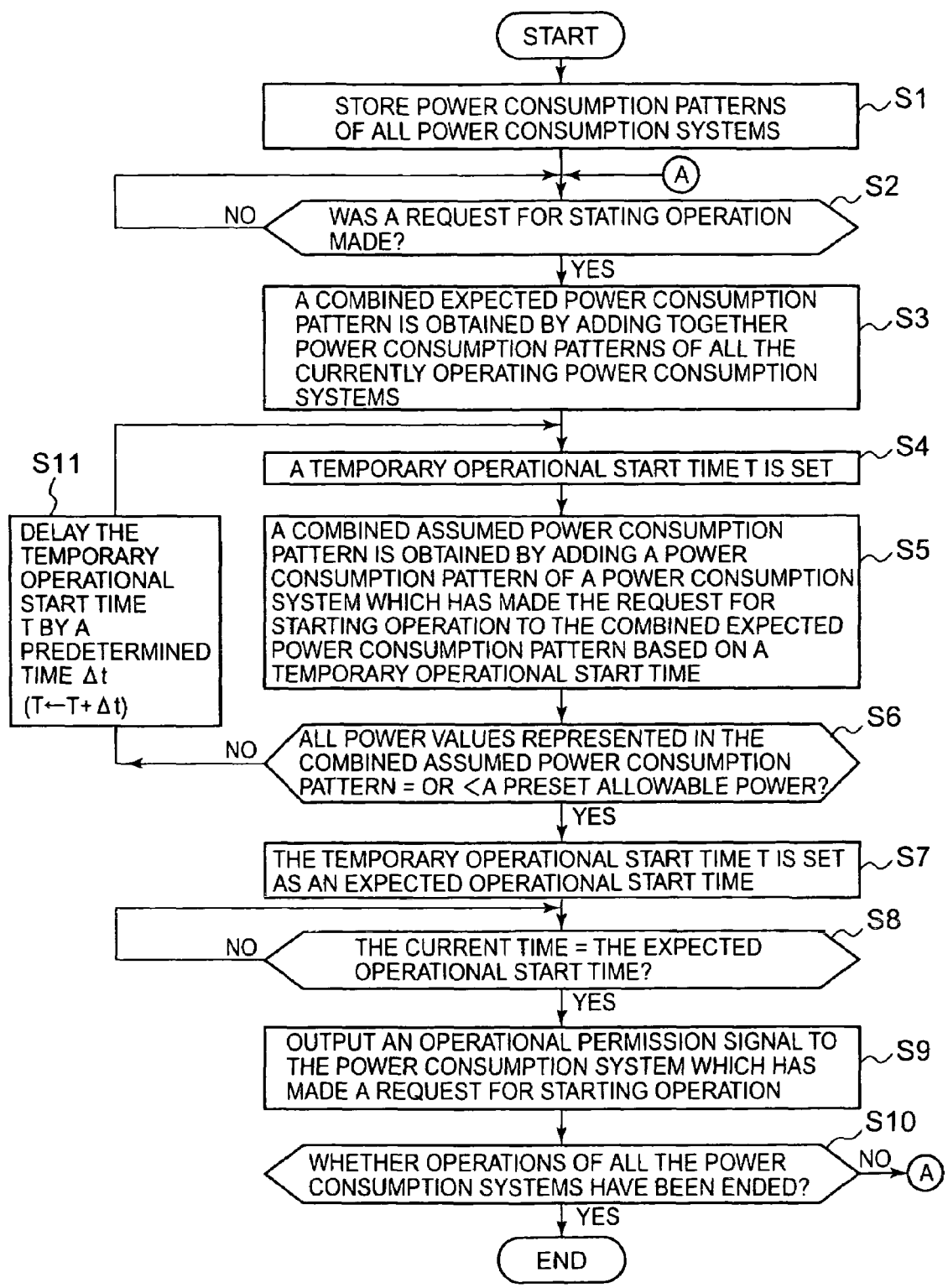
FIG. 4 is a flow chart showing an example of an operational control method which is performed using the operational control device.

FIG. 4 is a flow chart showing an example of an operational control method which is performed using the operational control device. Referring first to FIG. 3, it shows a state in which the processing equipment 8F makes a request for starting operation at a time T0 while the processing equipments 8A to 8E have already started their operations and these operations are underway (during operation). Namely, the processing equipment 8A started its operation at a start time T1, the processing equipment 8B started its operation at a start time T2, the processing equipment 8C started its operation at a start time T3, the processing equipment 8D started its operation at a start time T4, and the processing equipment 8E started its operation at a start time T5. To promote the understanding of this invention, it is assumed that the maximum power consumption of each processing equipment 8A to 8E is 100 kVA, and that the allowable power 42 of the power supply equipment 4 is 400 kVA.

First, the power consumption pattern (see FIG. 2) of each processing equipment 8A to 8F is stored in the power consumption pattern storage unit 24 (S1) of the operational control device 20 (see FIG. 1). The main control unit 22 of the operational control device 20 monitors whether a request for stating operation (operational start request signal) was made by any of the processing equipments 8A to 8F, cyclically at a high speed (S2).

When an idling processing equipment outputs a request for starting operation ("YES" in S2), the combined expected power consumption pattern 40 is obtained by adding together power consumption patterns of all the currently operating power consumption systems (processing equipments) (see FIG. 3). In FIG. 3, the processing equipment 8F outputs a request for starting operation at the time T0. While the combined expected power consumption pattern 40 before the time T0 (past pattern) is also depicted in FIG. 3 for reference, this past pattern portion is not necessary to be obtained in an actual process.

Next, a temporary operational start time T of the processing equipment 8F is set (S4). In this case, the time T0 at which the request for stating operation was made is set first as the temporary operational start time T.

Subsequently, a combined assumed power consumption pattern is obtained by adding a power consumption pattern of the processing equipment (power consumption system) 8F which has made the request for starting operation to the combined expected power consumption pattern 40 obtained as described above, based on the temporary operational start time T (S5). As described above, each power consumption pattern has been stored in the power consumption pattern storage unit 24. In FIG. 3, the combined assumed power consumption pattern is a pattern that is formed by simply adding or piling the power consumption pattern of the processing equipment 8F onto the combined expected power consumption pattern 40, based on the temporary operational start time T.

Thereafter, all power values represented in the combined assumed power consumption pattern are compared to the preset allowable power 42 to decide whether or not any of the values exceeds the preset allowable power 42 (S6). While the symbol "=" that means both sides are equal is included in Step 6, this symbol "=" may be eliminated.

In the case of "YES" of Step 6, if the operation of the processing equipment which has made a request for starting operation is started at the temporary operational start time T, the combined assumed power consumption pattern will not exceed the preset allowable power 42 over all of the range later than the time T. In other words, since the power supply equipment 4 is operated in a state having some electric power margin, even if the operation unit having made a request for starting operation is started to perform its operation, the power consumption will not exceed the preset allowable power 42. Accordingly, this temporary operational start time T may be set as an expected operational start time (S7). Such a series of operations are performed by tire expected operational start time decision unit 26.

The permission signal output unit 28 always monitors the current time, and if the current time reaches the expected operational start time decided as described above ("YES" in S8), it outputs operational permission (an operational permission signal) to the processing equipment (power consumption system) which has made a request for starting operation, through the main control unit 22 (S9). Immediately after receiving the operational permission, the processing equipment will start its operation.

Next, whether or not operations of all the processing equipments (power consumption systems) have been ended is decided. If not ended ("NO" in S10), the procedure returns to the Step 2, and the above-described steps are repeated. If all operations of the processing equipments have been ended ("YES" in S10), the operation of the operational control device is also ended. In this case, the series of arithmetic operations are performed by a computer in a moment or for a short time.

As described above, in a state where the power supply equipment 4 has a margin of power supply, after a request for starting operation is made in the Step S2, the procedure will advance immediately through the Step S3 to Step S9, and an operational permission signal is outputted in the Step S9.

If "No" in the Step S6, or if any electric power value represented in the combined assumed power consumption pattern exceeds, even partly, the preset allowable power, time "T+Δ t" is set as a new time "T" in order to delay the above temporary operational start time T by a predetermined time Δ t (S11). Next, returning to the Step S4, the new temporary operational start time T is set, and the procedure advances to the Step S5, then repeating the operations of the Steps S5 and S6. Thereafter, the operations of the Steps S3 to S6 and S11 are repeated until "YES" is decided in the Step S6.

Accordingly, each time the Step S11 is performed, the temporary operational start time T is delayed incrementally by Δ t based on the time T0 as a starting point. In other words, in FIG. 3, the power consumption pattern of the processing equipment 8F is shifted each time by Δ t from the time T0 as a starting point in the direction of the axis of time (the right direction), added to the combined expected power consumption pattern 40, and upon each addition, the resultant pattern is compared to the preset allowable power 42. Finally, the temporary operational start time at which the combined assumed power consumption pattern after the addition does no longer exceed the preset allowable power 42 is set as an expected operational start time (S7). FIG. 3 illustrates that the time at which the temporary operational start time is shifted to time Ts is set as the time at which "YES" is designated in the Step S6. While the above Δ0 t may be set in units of second, for example, one second or the like, but it is not limited to the units of second in particular. It should be noted that since the series of operations up to the Step S7 including the Step S11 can be arithmetically operated at a moment by a computer, time loss will not occur.

As stated above, the power consumption pattern that indicates changes in the power consumption of each power consumption system is obtained in advance. When a request for starting operation is made by a power consumption system, power consumption patterns of power consumption systems each operating at that time are summed together with adjustment of the axis of time. Then, the power consumption pattern of the power consumption system which has made the request for starting operation is added to the summed resultant pattern. Subsequently, the pattern obtained by the addition is compared to a preset allowable electric power. Finally, the power consumption pattern of the power consumption system which has made a request for starting operation is shifted in the direction of the axis of time to determine an expected operational start time. Therefore, high operating efficiency can be achieved while controlling the equipment cost. In addition, the productivity relative to the equipment cost can be enhanced to the maximum.

In the case where the preset allowable power is set lower than that shown in FIG. 3, and during a waiting time after a request for starting operation is made by one processing equipment, if another request for starting operation is made by another processing equipment, it is of course that the processing equipment which made the first request for starting operation is selected to start preferentially.

While in this embodiment an operational permission signal is outputted (S9) immediately after the current time reaches the expected operational start time in the Step S8, the power consumption of each processing equipment 8A to 8F at that time may be checked by measuring each power consumption system just before outputting the operational start permission signal. The electric power to be used may be active or apparent power.

While each power consumption pattern is obtained in advance and stored in the power consumption pattern storage unit 24, the power consumption pattern may be updated as needed. In order to update each power consumption pattern, actual data of the amount of power consumption on each process is stored in, for example, the memory unit 32 or the like, to update the power consumption pattern based on the data.

In this case, the update is carried out by using a power consumption pattern taking an average of all the past processes or by using a power consumption pattern taking an average of the most recent predetermined number of, for example, five, processes. In particular, since a change with time of a heater or the like can be reflected, it is preferred to carry out the update using a power consumption pattern taking an average of the most recent predetermined number of processes. As described above, the measurement of the amount of power consumption of each processing equipment can be obtained by the calculation based on values measured values by the watt-meters 16A to 16F, or on amounts of controlling open and close of the gate of the thyristor used in each power control portion 14A to 14F, or on the ON-OFF control time of the gate. The sampling time to obtain the amount of power consumption may be set, without any limitation, at, for example, one second, 10 seconds, or one minute to adapt to the processing mode of each processing equipment.

If a new processing equipment is introduced without any known power consumption pattern, this unit becomes usable by producing and storing an assumed power consumption pattern such that the maximum rated power capacity of this unit is used over the entire working time of the unit. Of course, in the later update of the power consumption pattern, it is preferred that such an assumed power consumption pattern is no longer used.

It is to be understood that the numerical examples described in the above embodiments are by way of illustration and not of limitation. It is also to be understood that while a batch-type processing equipment has been described as an example, the present invention is not limited to this type, and can also be applied to the so-called sheet-feeding-type unit for processing one sheet of wafer at a time. In addition, the material to be processed is not limited to wafers, and the present invention can also be applied to processing equipments for processing glass substrates or LCD substrates, as well as to other power consumption systems.

The invention claimed is:

1. An operational control device for a plurality of power consumption systems in a power supply system which is adapted to supply electric power from an electric power equipment to the plurality of power consumption systems in which whether or not to start the operation is decided depending on an external signal, the device comprising:
   a main control unit for controlling the operation of the entire body of the device;
   a power consumption pattern storage unit for storing in advance a power consumption pattern showing changes in the power consumption with respect to time elapsing after starting operation for each of the power consumption systems;
   an expected operational start time decision unit which (1) obtains a combined expected power consumption pattern by adding together power consumption patterns of operating power consumption systems based on an operational start time of each operating power consumption system in response to a request for starting operation from an idling power consumption system, (2) obtains a combined assumed power consumption pattern by adding a power consumption pattern, obtained based on a temporary operational start time, of the idling power consumption system which has made the request for starting operation to the combined expected power consumption pattern, (3) compares an electric power value represented in the combined assumed power consumption pattern to a preset allowable power of the power supply equipment, (4) delays the temporary operational start time of the power consumption pattern of the idling power consumption system which has made the request for starting operation along an axis of time until each of the power values represented in the combined assumed power consumption pattern is no longer above the preset allowable power, and (5) decides an expected operational start time based on the temporary operational start time at which all power values represented in the combined assumed power consumption pattern are smaller than the preset allowable power; and
   a permission signal output unit which outputs an operational permission signal to the idling power consumption system which has made the request for starting operation through the main control unit when the current time reaches the expected operational start time which was decided by the expected operational start time decision unit.

2. The operational control device for a plurality of power consumption systems according to claim 1, wherein
   each power consumption pattern can be updated.

3. The operational control device for a plurality of power consumption systems according to claim 2, wherein
   update of the power consumption pattern for each power consumption system is carried out based on an actual amount of power consumption during the past operations of each power consumption system.

4. The operational control device for a plurality of power consumption systems according to claim 3, wherein
   the actual amount of power consumption is decided based on the power consumption of the most recent predetermined number of processes.

5. The operational control device for a plurality of power consumption systems according to claim 3, wherein
   the actual amount of power consumption is obtained based on a watt-meter provided in the power consumption system.

6. The operational control device for a plurality of power consumption systems according to claim 3, wherein
   the actual amount of power consumption is obtained based on amounts of controlling opening and closing of a gate of a thyristor provided in a power control unit of the power consumption system.

7. The operational control device for a plurality of power consumption systems according to claim 3, wherein
   the actual amount of power consumption is obtained based on the ON-OFF control time of a gate of a thyristor provided in a power control unit of the power consumption system.

8. The operational control device for a plurality of power consumption systems according to claim 1, wherein
   the power consumption system is a processing unit for providing a predetermined process to a material to be processed.

9. An operational control method for a plurality of power consumption systems in a power supply system which is adapted to supply electric power from an electric power equipment to the plurality of power consumption systems in which whether or not to start the operation is decided depending on an external signal, the method comprising the steps of:
   storing in advance a power consumption pattern showing changes in power consumption with respect to time having elapsed after a starting operation for each of the power consumption systems;
   obtaining a combined expected power consumption pattern by adding together power consumption patterns of operating power consumption systems based on an operational start time of each operating power consumption system in response to a request for a starting operation from an idling power consumption system;
   obtaining a combined assumed power consumption pattern by adding a power consumption pattern, obtained based on a temporary operational start time, of the idling power consumption system which has made the request for the starting operation to the combined expected power consumption pattern, comparing an electric power value represented in the combined assumed power consumption pattern to a preset allowable power of the power supply equipment, delaying the temporary operational start time of the power consumption pattern of the idling power consumption system which has made the request for the starting operation along an axis of time until each of the power values represented in the combined assumed power consumption pattern is no longer above the preset allowable power, and deciding an expected operational start time based on the temporary operational start time at which all power values represented in the combined assumed power consumption pattern are smaller than the preset allowable power; and
   outputting an operational permission signal to the idling power consumption system which has made the request for the starting operation when the current time reaches the decided expected operational start time.

10. The operational control method for a plurality of power consumption systems according to claim 9, wherein each power consumption pattern can be updated.

11. The operational control method for a plurality of power consumption systems according to claim 10, wherein update of the power consumption pattern for each power consumption system is carried out based on an actual amount of power consumption during the past operations of each power consumption system.

12. The operational control method for a plurality of power consumption systems according to claim 11, wherein the actual amount of power consumption is decided based on the power consumption of the most recent predetermined number of processes.

13. The operational control method for a plurality of power consumption systems according to claim 11, wherein the actual amount of power consumption is obtained based on a watt-meter provided in the power consumption system.

14. The operational control method for a plurality of power consumption systems according to claim 11, wherein the actual amount of power consumption is obtained based on amounts of controlling opening and closing of a gate of a thyristor provided in a power control unit of the power consumption system.

15. The operational control method for a plurality of power consumption systems according to claim 11, wherein the actual amount of power consumption is obtained based on the ON-OFF control time of a gate of a thyristor provided in a power control unit of the power consumption system.

16. The operational control method for a plurality of power consumption systems according to claim 9, wherein the power consumption system is a processing unit for providing a predetermined process to a material to be processed.

17. A storage medium storing a program of controlling an operational control device for a plurality of power consumption systems in a power supply system which is adapted to supply electric power from an electric power equipment to the plurality of power consumption systems in which whether or not to start the operation is decided depending on an external signal, the program performing the steps of:

storing in advance a power consumption pattern showing changes in power consumption with respect to time having elapsed after a starting operation for each of the power consumption systems;

obtaining a combined expected power consumption pattern by adding together power consumption patterns of operating power consumption systems based on an operational start time of each operating power consumption system in response to a request for a starting operation from an idling power consumption system;

obtaining a combined assumed power consumption pattern by adding a power consumption pattern, based on a temporary operational start time, of the idling power consumption system which has made the request for the starting operation to the combined expected power consumption pattern, comparing an electric power value represented in the combined assumed power consumption pattern to a preset allowable power of the power supply equipment, delaying the temporary operational start time of the power consumption pattern of the idling power consumption system which has made the request for the starting operation along an axis of time until each of the power values represented in the combined assumed power consumption pattern is no longer above the preset allowable power, and deciding an expected operational start time based on the temporary operational start time at which all power values represented in the combined assumed power consumption pattern are smaller than the preset allowable power; and outputting an operational permission signal to the idling power consumption system which has made the request for the starting operation when the current time reaches the decided expected operational start time.

* * * * *